No. 844,744. PATENTED FEB. 19, 1907.
R. SCHOFIELD.
SHEARING MACHINE.
APPLICATION FILED OCT. 10, 1906.
2 SHEETS—SHEET 2.
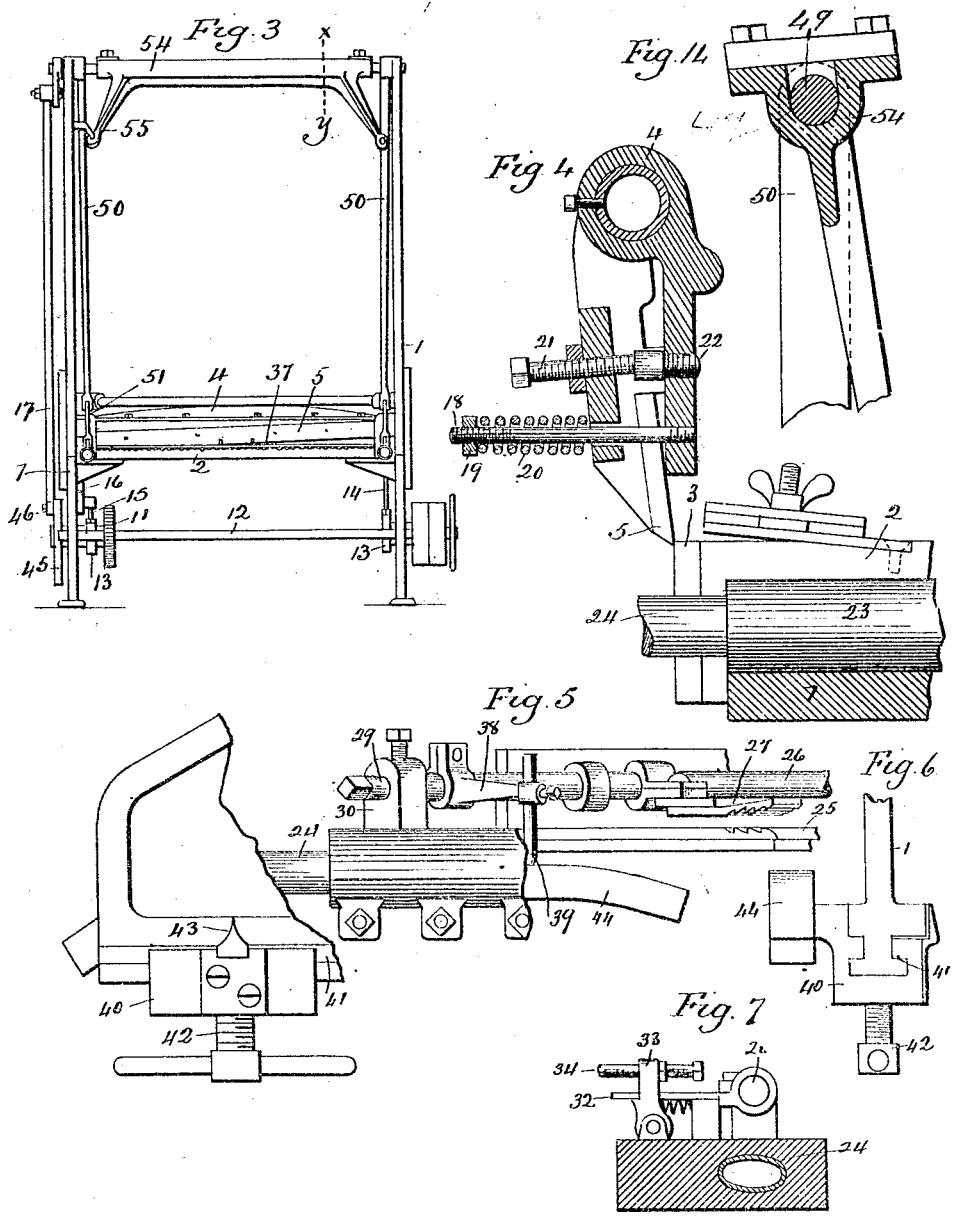

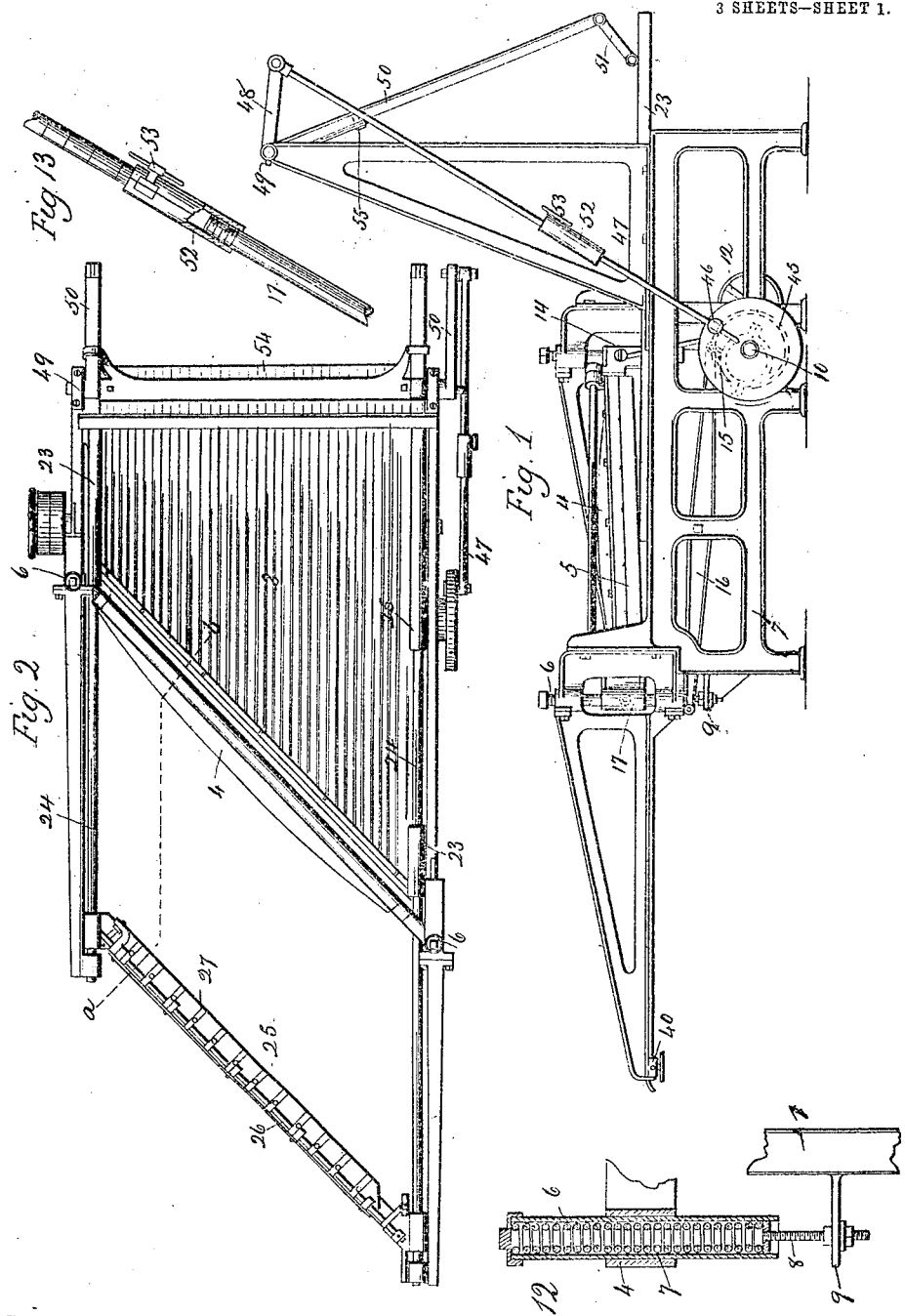

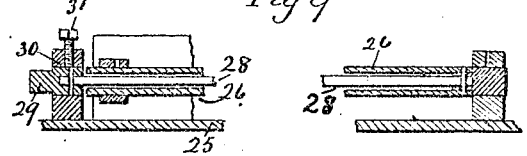
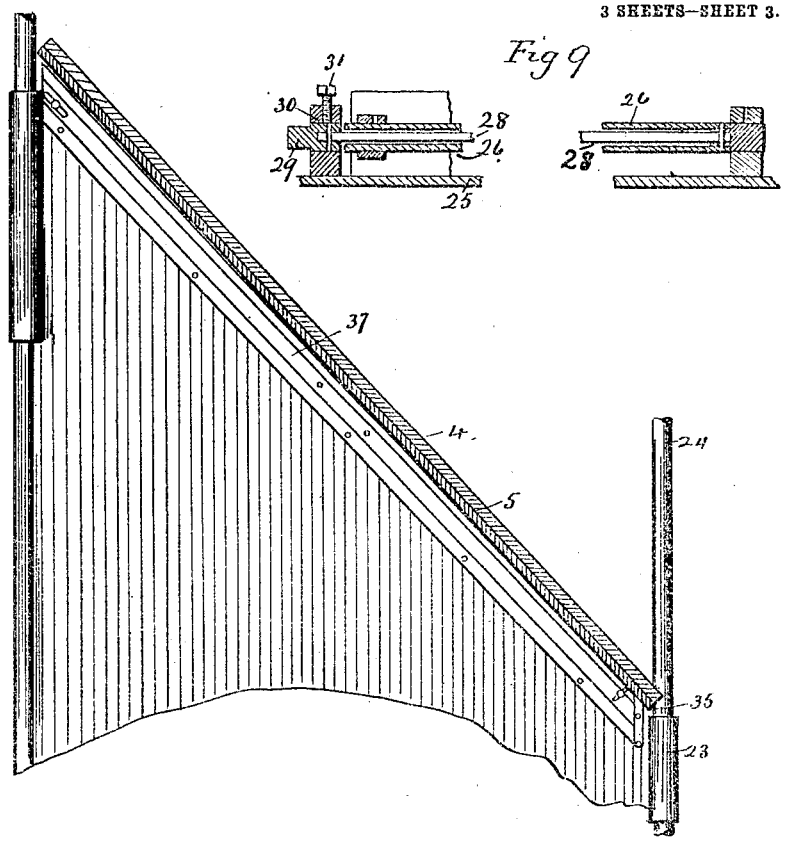
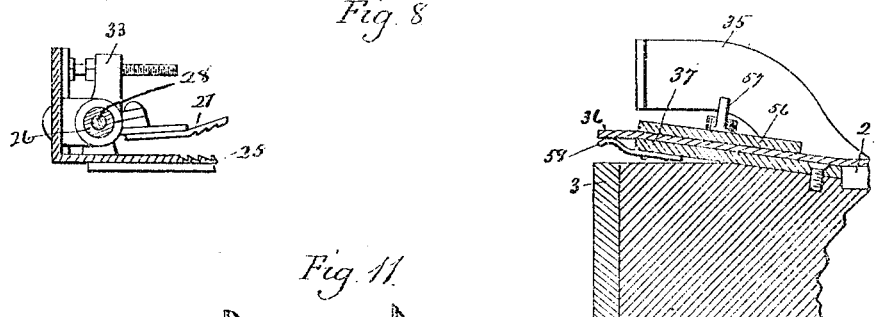
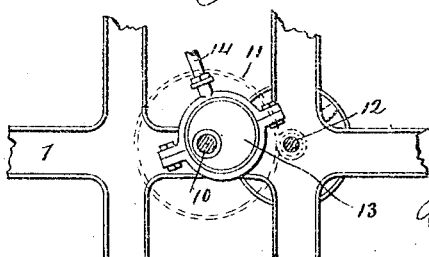

UNITED STATES PATENT OFFICE.

RICHARD SCHOFIELD, OF TORONTO, ONTARIO, CANADA, ASSIGNOR TO THE BIRMINGHAM IRON FOUNDRY, OF DERBY, CONNECTICUT, A CORPORATION.

SHEARING-MACHINE.

No. 844,744.

Specification of Letters Patent.

Patented Feb. 19, 1907.

Application filed October 10, 1906. Serial No. 338,280.

*To all whom it may concern:*

Be it known that I, RICHARD SCHOFIELD, a subject of Great Britain, residing at Toronto, in the Province of Ontario and Dominion of Canada, have invented a new and useful Improvement in Shearing-Machines; and I do hereby declare the following, when taken in connection with the accompanying drawings and the letters of reference marked thereon, to be a full, clear, and exact description of the same, and which said drawings constitute part of this specification, and represent, in—

Figure 1, a side elevation of my improved machine; Fig. 2, a plan view of the same; Fig. 3, an end elevation of the same from the right-hand side; Fig. 4, an enlarged vertical section of the stationary and movable shear-blades; Fig. 5, an enlarged detail in elevation of part of the feed mechanism; Fig. 6, an end elevation of the adjustable stop for disengaging the feed mechanism from the fabric; Fig. 7, a side elevation showing the detent which serves to retain the fingers of the feed mechanism in their disengaged position; Fig. 8, a section on the line $a\,b$ of Fig. 2; Fig. 9, a sectional detail showing the spring for the finger-bar of the feed mechanism; Fig. 10, an enlarged plan view of the stationary shear-blade and bed part of the movable shear-blade being shown in section; Fig. 11, a sectional detail of part of the machine, showing part of the gearing; Fig. 12, a sectional detail of one of the spring-counterbalances for the movable shear-blade; Fig. 13, a sectional detail showing the method of adjusting the length of the pitman and the drive of the feed mechanism; Fig. 14, a section, partly in elevation, on the line $x\,y$ of Fig. 3.

My invention relates to machines used for cutting cloth or other materials of considerable width and in which the cutting is done by a vertically-movable knife or shear-blade coöperating with a stationary knife or shear-blade.

My object is to so arrange the apparatus that there is perfect cutting contact between the shear-blades at the point of shearing at any given moment during the whole length of the cut without in any way sacrificing the rigidity of the movable shear-blade, to provide simple and effective means for operating the movable shear-blade, and to provide means for feeding the material to be cut which will be reliable and accurate and not liable to stick or get out of line.

With these objects in view my invention consists, essentially, of the constructions hereinafter described and then definitely claimed.

1 is the frame of the machine, suitably shaped to support different parts.

2 is the bed, preferably corrugated back of the stationary knife or shearing-blade 3.

4 is the knife-bar of the movable shearing-blade or knife 5. The knife-bar 4 is secured to the vertical rods 6, having suitable bearings on the frame of the machine. These rods are preferably hollow, as shown in Fig. 12, and each contains a coil-spring 7, bearing against the upper end of the rod and against the head of a bolt 8, which is adjustable on a bracket 9 by means of suitable nuts. By vertically adjusting these bolts the tension of the spring will be adjusted to accurately counterbalance the weight of the movable knife and the connected parts.

The movable knife is operated from the shaft 10, driven by means of gearing 11 from the main shaft 12, provided with the usual fast-and-loose pulleys. For the purpose of driving the movable knife the shaft 10 carries two eccentrics 13 or their equivalent. One eccentric is directly connected to one end of the knife-bar by means of the eccentric-rod 14. As this machine is intended particularly for cutting bias goods, and as the shearing-blades are therefore on the bias, the second eccentric 13 has its eccentric-rod 15 connected with one end of the walking-beam 16, pivoted at its middle on the frame of the machine. The other end of the walking-beam is connected, by means of a link 17, with the adjacent end of the knife-bar. As the eccentrics are set diametrically opposite one another as regards their throw it will be seen that the movable shearing-blade is reciprocated in perfect synchronism at each end.

A very important feature in my invention is the arrangement of the movable shearing-blade, which I will now describe.

Referring particularly to Figs. 2 and 10, it will be seen that the movable blade is not arranged parallel to the stationary blade as viewed from above, but that it lies in a vertical plane intersecting at an acute angle the vertical plane which lies at the cutting edge of the stationary shearing-blade. This is accomplished by hinging the movable blade itself at the desired angle on the knife-bar by its upper edge. From the knife-bar 4 one or more stems 18 extend through suitable holes in the movable knife. These stems are provided with nuts 19, screwed thereon. On each stem, between the nut and the movable knife-blade, is a coil-spring 20. The movable blade is also provided with set-screws 21, preferably corresponding in number and location to the stems 18. These set-screws engage the knife-bar preferably by engaging the heads of studs 22, screwed therein. The springs, it will be seen, tend to throw the movable shearing-blade into contact with the stationary shearing-blade, while the extent of the forward motion may be limited by means of the set-screws 21. The lower edge of the movable shearing-blade is also cut on the bevel in the ordinary manner. The axis on which the knife-bar is pivoted is also, it will be seen, set back from the vertical plane in which the cutting edge of the stationary knife-blade lies.

The result of the construction just described is that the stationary knife and movable knife can only engage one another at one point at any given time. At the commencement of the downward stroke this engagement will take place at that end of the movable shearing-blade which is set forward the farther from the stationary blade. As the cut progresses and the knife moves downward this point of contact shifts along toward the other side of the machine, the movable shearing-blade rocking on its hinge to permit each successive portion of the movable blade shifting forward to the cutting-line represented by the edge of the stationary blade. This movement results in the machine having a perfect shearing cut similar to the cut of an ordinary pair of good handshears, and it will be observed that I accomplish this result with the use of two perfectly rigid shearing-blades. I thus avoid all the difficulties which occur with ordinary shearing-blades in which the cutting edges of the stationary and movable knives are in the same vertical plane. In this latter case it is absolutely impossible to make the shearing-blades and keep them mathematically perfect from end to end, so as to produce edges capable of properly shearing all classes of fabrics.

With my rigid and yet spring-held movable knife any irregularities in the cutting edges are immediately compensated for, as the movable cutting-knife is always automatically pressed forward to effectually engage with the stationary blade at that one point in its edge which requires to be at any given moment in the cutting-line.

It will be noted that, as already described, the pivot or hinge of the movable blade is set forward from the edge of the stationary blade. This has a tendency to cause the movable blade to hug tightly the stationary blade. For cutting thin fabric I would probably locate this point farther forward than for the cutting of stiffer or heavier fabrics, as the former are more difficult to shear with a good clean cut.

In connection with the apparatus I employ a special feed which works with absolute accuracy and certainty. At each side of the bed 1 form guides 23, through which slide the side bars 24. Connected at each end to these side bars is the transverse feed-bar 25. On this feed-bar is journaled the finger-bar 26, carrying the gripping-fingers 27. The finger-bar is hollow, and contained therein is a torsion-spring 28. (See Fig. 9.) One end of this torsion-spring is rigidly held in a block 29, journaled in the lug 30 on the feed-bar. By means of this block the tension of the spring may be adjusted and the block subsequently clamped by means of the set-screw 31. The finger-bar is held with the fingers disengaged from the feed-bar by an arm 32, which engages a spring-actuated detent 33. (See Fig. 7.) Through this detent is screwed an adjustable contact-screw 34. At one end of the bed is secured a stop 35, with which the contact-screw 34 may engage when the feed-bar has reached a position for the fingers to engage the edge of the fabric 36. This contact releases the detent and allows the fingers to close upon the edge of the fabric, which latter is normally raised slightly above the stationary knife by means of a guide comprising a plate 37, secured to the bed 2 and projecting slightly upward at an angle therefrom toward the stationary cutter 3 and the upper plate 56, which is arranged above the plate 37 and parallel therewith, between which plates the fabric 36 passes, the plate 56 being adapted to be moved toward or from the plate 37 by thumb-nuts 57, whereby the plate may be pressed with more or less friction upon the fabric. (See particularly Figs. 4 and 8.) Connected with the finger-bar is an arm 38, through the end of which a contact-piece 39 is vertically adjustable. (See particularly Fig. 5.)

A slide 40 is longitudinally movable on the guides 41, formed on the end of the frame of the machine. This slide may be clamped by means of a set-screw 42. This slide is also preferably provided with a pointer 43, which serves to indicate the exact position of the slide. The slide carries the cam-piece 44, which is adapted to engage the contact-piece 39 and rock the finger-bar to permit of the arm 32 engaging the detent 33. Thus at the forward end of its stroke the feed mechanism is disengaged from the fabric and reëngaged with the fresh-cut edge at the rearward end of its stroke.

In order to hold the edge of the fabric up in position to be gripped by the feed-bars, I preferably attach to the under side of the plate 37 a series of spring-fingers 58, which project beyond the guide and bear against the under face of the fabric slightly in rear of the edge of the stationary cutter 3 and so that when the movable blade rises the fingers will force the edge of the fabric upward.

While the engagement of the fabric is at a substantially constant position, yet the disengagement may be accomplished at any desired point by adjusting the slide 40 back and forth on its guides.

The reciprocating movement of the feed mechanism is imparted in the following manner: On the end of the shaft 10 is secured a crank-disk 45, provided with a radially-adjustable wrist-pin 46, of any ordinary construction. Journaled on the wrist-pin is a pitman 47, the other end of which is pivotally connected with the crank-arm 48, secured to the end of the shaft 49, journaled on an upward extension of the frame. Secured to this shaft are the crank-arms 50. The lower ends of these crank-arms are pivotally connected, by means of the links 51, with the ends of the side bars 24.

It will be noted on reference particularly to Fig. 2 that the guides 23, adjacent to the rear end of the machine, are slotted to permit of the passage of the connections between the side bars and the links.

The mechanism described is of course suitably proportioned and timed to feed a fresh length of fabric while the knife is in its up position and to effect the return stroke while the knife is engaged in cutting.

By adjusting the wrist-pin 46 to and from the shaft 10 the length of the stroke of the feed mechanism may be adjusted; but as such an adjustment shortens the stroke at both ends and as it is necessary that the shortening shall take place only at the forward end of the stroke I make the pitman 47 adjustable in length by forming it in two parts, one part carrying a split sleeve 52, within which the end of the other part may be adjustably clamped by means of a thumb-screw 53. A suitable scale is preferably marked on the end so adjustably held as a convenience in setting the feed. Thus by using both the adjustment of the crank and the adjustment of the pitman any desired length of feed may be obtained, while I insure that the feed mechanism will at all times reach the proper position to engage the fresh-cut edge of the fabric.

I have found that there is much difficulty in getting a shaft, such as 49, which will be of sufficient stiffness to avoid torsion, and any torsional spring in the shaft means that the two side bars will not move exactly in unison, which results in jamming in the guides and in a lack of a proper constant parallelism between the feed-bar and the shearing-blades. A shaft strong enough to be free from torsion under the strain to which it is subjected would be far too heavy and massive to be employed in the position in which the shaft 49 is located. I therefore overcome the difficulty by placing on the shaft 49 a sleeve 54, provided with the arms 55. One of these arms is clamped to one of the arms 50. In setting up the machine the other two arms 50 and 55 will stand at an angle to one another. They are then drawn together to twist the shaft and sleeve in opposite directions until each is strained as far as it can be, having reference to the power they are expected to transmit. These last two arms are then linked together. This combined structure will be found to be exceedingly stiff and will show no signs of torsion when the machine is in operation.

When in operation, my machine runs perfectly and without noise or vibration. Its feed is regular, positive, and certain, and the shearing is accomplished with absolute certainty and perfection of cut.

I claim—

1. In a shearing-machine the combination of a stationary shearing-blade, a vertically-movable cross-bar, a stiff shearing-blade horizontally hinged thereon by its upper edge in a vertical plane intersecting at an acute angle the vertical plane in which lies the cutting edge of the stationary shearing-blade, the lower edge of the movable blade being also on a bevel or incline relative to the horizontal, and springs engaging the bar and the blade tending to press forward the latter into engagement with the stationary shearing-blade, substantially as described.

2. In a shearing-machine, the combination of a stationary shearing-blade, a vertically-movable cross-bar, a stiff shearing-blade horizontally hinged thereon by its upper edge in a vertical plane intersecting at an acute angle the vertical plane in which lies the cutting edge of the stationary shearing-blade, the lower edge of the movable blade being also on a bevel or incline relative to the horizontal, springs engaging the bar and the blade tending to press forward the latter into engagement with the stationary shearing-blade, and a set-screw forming an adjustable stop to the forward movement of the movable blade, substantially as described.

3. In a shearing-machine, the combination of a transverse stationary shearing-blade set on the bias, a vertically-movable shearing-blade adapted to coöperate therewith, a cross-shaft at an angle to and below the blades, and connections therefrom to the opposite ends of said movable blade for raising or lowering the same.

4. In a shearing-machine the combination of a transverse stationary shearing-blade set on the bias, a vertically-movable shearing-blade adapted to coöperate therewith, a cross-shaft at an angle to and below the blades, eccentrics at the opposite ends of said cross-shaft and connections between the said eccentrics and the respective ends of the movable blade for raising or lowering the same.

5. In a shearing-machine, the combination of a transverse stationary shearing-blade set on the bias, a vertically-movable shearing-blade adapted to coöperate therewith, a cross-shaft, an eccentric thereon below one end of the movable blade, an eccentric-rod therefor pivoted on the movable shearing-blade, an eccentric on the other end of the shaft, a fulcrumed walking-beam operated by the second eccentric and suitably connected with the other end of the movable blade, substantially as described.

6. In a shearing-machine a feed-bar longitudinal rods to which said feed-bar is connected, guides for said rods at opposite sides of the machine, a rock-shaft, arms secured to said shaft, operating connections between the arms and the rods, and a sleeve on the shaft, the sleeve and the shaft being twisted in opposite directions and clamped together, substantially as described.

7. In a shearing-machine, the combination with the feeding mechanism of a rock-shaft, a sleeve thereon, the shaft and sleeve being twisted in opposite directions and clamped together, means connected to one end of the pair formed by the shaft and sleeve for rocking them, and rock-arms connected one to each end of said pair for operating the feed mechanism, substantially as described.

8. In a shearing-machine, the combination with the feeding mechanism of a rock-shaft, rock-arms secured thereto, a sleeve on the shaft, arms connected with the sleeve, and means connected to one end of the shaft for rocking the same, the shaft and sleeve being twisted in opposite directions and the arms on the sleeve secured to the arms on the shaft for operating the feed mechanism, substantially as described.

9. In a shearing-machine the combination of a feed-bar, longitudinal rods to which said feed-bar is connected, guides for said rods at opposite sides of the machine, a rock-shaft, arms secured to said shaft, operating connections between the shaft and the rods, a crank-arm on the shaft, a driving-shaft, a crank-disk on the driving-shaft, a wrist-pin radially adjustable on the disk, a pitman connecting the wrist-pin and crank-arm, and means for adjusting the length of said pitman, substantially as described.

10. In a shearing-machine, the combination of a feed-bar, longitudinal rods to which said feed-bar is connected, guides for said rods at opposite sides of the machine, a rock-shaft, arms secured to said shaft, operating connections between the shaft and the rods, a crank-arm on the shaft, a driving-shaft, a crank-disk on the driving-shaft, a wrist-pin radially adjustable on the disk, a pitman connecting the wrist-pin and crank-arm, means for adjusting the length of said pitman, gripping means carried by the feed-bar, means for engaging the gripping means with the fabric, and means for releasing the gripping means adjustable lengthwise of the machine, substantially as described.

11. In a shearing-machine feed mechanism comprising a transverse feed-bar, a finger-bar journaled thereon, gripping-fingers fast on the finger-bar and adapted to coöperate with the feed-bar to grip the edge of the fabric to be fed, means tending to engage the fingers with the feed-bar, longitudinal guides on which said feed-bar is longitudinally movable, means for reciprocating the feed-bar on said guides, a detent adapted to hold the finger-bar with its fingers out of engagement with the feed-bar, a stop adjacent to the shears adapted to release the detent, and means at the opposite end of the stroke of the feed-bar adapted to rock the finger-bar to disengage the fingers and engage the detent, substantially as described.

12. In a shearing-machine feed mechanism comprising a transverse feed-bar, a finger-bar journaled thereon, gripping-fingers fast on the finger-bar and adapted to coöperate with the feed-bar to grip the edge of the fabric to be fed, means tending to engage the fingers with the feed-bar, longitudinal guides on which said feed-bar is longitudinally movable, means for reciprocating the feed-bar on said guides, a detent adapted to hold the finger-bar with its fingers out of engagement with the feed-bar, a stop adjacent to the shears adapted to release the detent, means at the opposite end of the stroke of the feed-bar adapted to rock the finger-bar to disengage the fingers and engage the detent, and means for adjusting the disengaging means lengthwise of the machine, substantially as described.

13. In a shearing-machine feed mechanism comprising a transverse feed-bar, a hollow finger-bar journaled thereon, gripping-fingers fast on the finger-bar and adapted to coöperate with the feed-bar to grip the edge of the fabric to be fed, means tending to engage the fingers with the feed-bar, longitudinal guides on which said feed-bar is longitudinally movable, means for reciprocating the feed-bar on said guides, a detent adapted to hold the finger-bar with its fingers out of engagement with the feed-bar, a stop adjacent to the shears adapted to release the detent, and means at the opposite end of the stroke of the feed-bar adapted to rock the finger-bar to disengage the fingers and engage the detent, substantially as described.

14. In a shearing-machine, the combination with the bed, of a stationary shearing-blade at the forward edge thereof, a movable shearing-blade coacting with the stationary blade, a guide-plate secured to the bed of the machine in rear of the stationary blade, said plate projecting upwardly therefrom, a clamping-plate and spring-fingers secured to the under face of the guide-plate and projecting forwardly therefrom.

15. In a shearing-machine, the combination with a stationary shearing-blade, a vertically-movable cross-bar, a stiff shearing-blade horizontally hinged thereon, said cross-bar mounted on vertically-arranged tubular rods arranged at opposite ends of the cross-bar and closed at their upper ends, a spring within each tubular rod, bearings at each side of the machine over which said tubular rods extend and on which the lower ends of said springs rest whereby the vertically-movable cross-bars are counterbalanced, substantially as described.

In testimony whereof I have signed this specification in the presence of two subscribing witnesses.

RICHARD SCHOFIELD.

Witnesses:
ALLINGTON T. BOWLBY,
ROBT. J. PRITTIE.